United States Patent [19]

Barrett et al.

[11] Patent Number: 5,082,493
[45] Date of Patent: Jan. 21, 1992

[54] PROCESSING OF CARBON STEEL FURNACE DUSTS

[75] Inventors: Everett C. Barrett, Richmond Hill; Emil H. Nenniger, Oakville, both of Canada

[73] Assignee: Hatch Associates Ltd., Toronto, Canada

[21] Appl. No.: 691,792

[22] Filed: Apr. 26, 1991

Related U.S. Application Data

[63] Continuation-in-part of Ser. No. 539,593, Jun. 18, 1990.

[51] Int. Cl.$^5$ .............................. C22B 5/00
[52] U.S. Cl. ............................... 75/743
[58] Field of Search ................... 75/743

[56] References Cited

U.S. PATENT DOCUMENTS

| | | | |
|---|---|---|---|
| 3,293,027 | 12/1966 | Machiw | 75/743 |
| 3,929,598 | 12/1975 | Stern | 75/743 |
| 4,614,543 | 9/1986 | Duyvesteyn | 75/743 |

FOREIGN PATENT DOCUMENTS 2242351 3/1974 Fed. Rep. of Germany.
1092195 5/1984 U.S.S.R. .

OTHER PUBLICATIONS

"The Hydrometallurgical Treatment of Carbon Steel Electric Arc Furnace Dusts by the UBC-Chaparral Process", Dreisinger et al., Journal of Hydrometallurgy, vol. 25, pp. 137-152, Oct. 1990.

"Hydrometallurgical Treatment Options for Carbon Steel Electric Arc Furnace Dusts" Dreisinger et al., Proceedings of second international conference on separation science & Technology published by CSChE, Oct. 1989.

*Primary Examiner*—Peter D. Rosenberg
*Attorney, Agent, or Firm*—Ridout & Maybee

[57] ABSTRACT

In a process for the hydrometallurgical treatment of electric arc furnace dusts which includes an acetic acid leach, the acetic acid solution used to perform the leach is made strong enough to dissolve heavy metal residues in the dusts, the iron-containing residues of which are recycled to a steel producing furnace. Zinc and other heavy metals are precipitated from hot acetic acid solution as useful products by the use of hydrogen sulphide. Calcium is then precipitated from the acetic acid solution as a clean gypsum using a deficiency of sulphuric acid, thus avoiding leaving sulphate ions in solution in sufficient concentration to interact with the dust and form sulphates in the iron containing residues when the acetic acid is recycled to the leaching step.

7 Claims, 1 Drawing Sheet

PROCESSING OF CARBON STEEL FURNACE DUSTS

REFERENCE TO RELATED APPLICATION

This application is a continuation-in-part of our co-pending application No. 07/539,593, filed June 18, 1990.

BACKGROUND OF THE INVENTION

1. Field of the Invention

This invention relates to a process for the treatment of carbon steel furnace dusts, and other dusts of similar composition, to facilitate their disposal in an environmentally acceptable manner.

2. Review of the Art

Such dusts have been categorized as hazardous materials because of their significant content of heavy metal compounds which can be leached from the dusts if these are used as landfill. A number of hydrometallurgical processes have been proposed or developed for the treatment of these and similar dusts, several of which are described and reviewed in an article, "Hydrometallurgical Treatment Options for Carbon Steel Electric Arc Furnace Dusts", Dreisinger, Peters & Morgan, Proceedings of the Second International Conference on Separation Science and Technology, published by CSCLE, October 1989.

Other processes employing acetic acid leaching are described in Russian Patent No. 1,092,195 and German OLS 2242351. An objective of such processes (other than that of the Russian patent) is to reduce the leachable content of calcium, zinc and other heavy metals in such dusts to levels which permits their dumping, or recycling to the metallurgical process which generated them: the zinc and heavy metal content should preferably be recovered in forms themselves suitable for metallurgical processing for recovery of the metals concerned. The Russian patent is primarily concerned with the recovery of zinc from the dusts.

Both the UBC-Chaparral process and the German patent utilize an acetic acid leach as just one stage in a multiple leach process for treating such dusts. The resulting multiple leach processes are complex, with potential adverse effects upon their economic practicability, and the zinc and other heavy metals are recovered as carbonates or cementation products which, whilst commercially valuable, may be less acceptable to conventional smelters than conventional sulphide concentrates. The Russian patent deliberately sets acetic acid leach conditions such that other heavy metals are not leached, its primary objective being the recovery of zinc oxide from the dusts; it is not intended to remove other heavy metals from the dusts and is ineffectual in that respect.

SUMMARY OF THE INVENTION

An object of the present invention is to provide a simplified process, based upon an acetic acid leach, which is effective in leaching sufficient of the heavy metals from the dusts so that the residual material, namely iron oxides and ferrites, may be recycled to the furnace, whilst zinc and heavy metals leached from the dusts are recovered as sulphides acceptable to conventional smelters, and at the same time calcium is removed from the hydrometallurgical cycle.

According to the invention, a method of processing carbon steel furnace dusts comprises the steps of subjecting the dusts to leaching by acetic acid of sufficient concentration substantially to dissolve zinc and other heavy metal values into acetic acid solution, separating the undissolved residues, treating the acetic acid solution with hydrogen sulphide to precipitate zinc and other heavy metal sulphides, removing the sulphides, and treating the acetic acid solution with only sufficient sulphuric acid to precipitate most calcium present as calcium sulphate and regenerate acetic acid without leaving significant levels of sulphate ions in solution, the acetic acid being returned to the leaching step. Preferably the acetic acid is subjected to a treatment to remove magnesium ions prior to recycling, for example by ion exchange.

The use of the sulphide precipitation step enables a greatly simplified process to be utilized, which recovers zinc and heavy metals in commercially desirable sulphide form, while regenerating acetic acid. Calcium can subsequently be precipitated as calcium sulphate and removed from the system. The process minimizes the production of liquid effluents requiring treatment before discharge: all principal outputs from the process are solid and either commercially valuable or can usefully be recycled to a steel producing furnace.

Further features of the invention will be described below with reference to a presently preferred embodiment of the invention and with reference to the accompanying drawing.

SHORT DESCRIPTION OF THE DRAWING

FIG. 1 is a flow diagram illustrating operation of the invention.

DESCRIPTION OF THE PREFERRED EMBODIMENT

Figure 1:
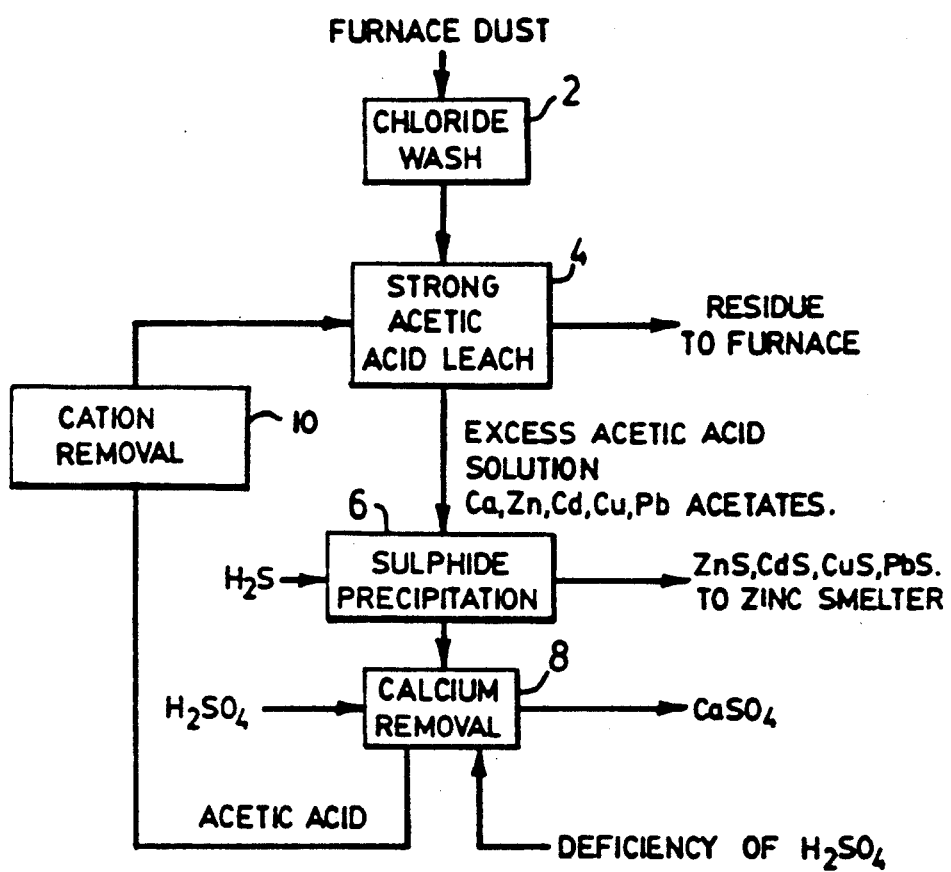

A typical analysis by weight of carbon steel electric arc furnace dust is as follows, obtained from a sample produced at the plant of Chaparral Steel in Midlothian, Texas:

| | | | |
|---|---|---|---|
| Si | 1.6% | Pb | 4.0 |
| Fe | 21 | Cu | 0.38 |
| Al | 0.6 | Cr (total) | 0.19 |
| Ca | 12.5 | Mn | 2.25 |
| Mg | 1.6 | Cd | 0.18 |
| Na | 1.0 | Ni | <0.1 |
| K | 0.68 | S | 0.40 |
| Zn | 20.5 | Cl | 3.8 |

The base metals are present mainly as oxides and carbonates.

A survey of other electric arc furnace dusts from various installations in the United States of America showed contents of zinc from 11 to 27% by weight, lead from 1.09 to 3.81% by weight, cadmium from 0.03 to 0.15% by weight, and chromium (hexavalent) from 0.01% to 0.02% by weight.

Referring to FIG. 1, the process of the present invention may commence by subjecting the dust to a chloride washing step 2 similar to that utilized in the UBC/Chaparral process, but this step may be dispensed with where the chloride content of the dust is sufficiently low not to interfere with the remainder of the cycle: the omission of this step is desirable where possible, since it both eliminates a step from the process, and eliminates the necessity for treating contaminated wash water.

The dust is then subjected to a leaching step 4 in an excess of strong, typically 3 molar, acetic acid to remove base metals from the dust, resulting in the free zinc, lead, chromium, and cadmium content being dissolved, together with most of the calcium and other leachable metals present, leaving mainly iron oxides and ferrites, which are dried and preferably returned to a steel producing furnace. Whilst we have verified that it should usually be possible to remove heavy metals from the dust to an extent sufficient to meet current environmental standards for landfill material, removal of the heavy metals also permits continuous recycling of the undissolved constituents to the furnace which generates the dusts or another steel producing furnace, whilst permitting removal of calcium, zinc and heavy metals from the system, thus avoiding the production of by-products suitable only as landfill.

The acetic acid solution is treated with hydrogen sulphide in a step 6 in which zinc, cadmium, copper, lead and other heavy metals are precipitated as insoluble sulphides which are recovered, providing a sulphide concentrate very acceptable for zinc smelters. If desired, step 6 may be preceded by cementation using zinc dust to cement out metallic lead and copper prior to sulphide precipitation.

The quantity of hydra sulphide added during the step 6 is maintained at a sufficient level to ensure that to all of the calcium remains in solution, and in a following step 8, the calcium is precipitated by the addition of sulphuric acid sufficient only to precipitate most of the calcium as calcium sulphate whilst minimizing the residual sulphate ions in solution. This step regenerates the acetic acid, which is subsequently returned to step 4 together with sufficient make-up acetic acid to maintain a desired acetic acid concentration in the leaching step. The content of sulphate ions in the recycled acetic acid should be minimized to avoid sulphate interaction with the dust and sulphate contamination of dust recycled to the steel producing furnace, whilst it is desirable to remove magnesium ions which will otherwise accumulate in the system since they are not substantially removed by the precipitation steps.

It is therefore preferred that the regenerated acetic acid is subjected to procedure 10 for the removal of magnesium ions prior return to step 4. This will typically rely on the use of an ion exchange technique. For example, a two stage ion exchange procedure may be utilized. In the first stage the acetic acid solution is passed through a strong acidification exchange resin to remove metal ions such as magnesium and regenerate acetic acid from the associated acetate radicals, and a weak-base anion exchange resin to capture chloride and sulphate ions. The resins may be regenerated using sulphuric acid and caustic soda solutions respectively.

Other available ion exchange techniques or other suitable means of removing magnesium ions from the acetic acid solution may be substituted if found to be advantageous. For example, it is possible to recover acetic acid by distillation, but the distillation process is complicated by the fact that acetic acid is less volatile than water. Moreover, depending on concentrations of magnesium and other undesirable ions in the recycled solution, it may only be necessary to process a proportion of the recycled solution in order adequately to control concentrations of unwanted ions.

Excess water in the regenerated acetic acid can be removed if required by some standard technique such as reverse osmosis or evaporation.

Stages 4 (acetic acid 6 (sulphide precipitation) and 8 (calcium removal) are illustrated by the following non-limitative Examples.

EXAMPLE 1

ACETIC ACID LEACH

A slurry of 450 g of water leached furnace dust in 3 L of 3 molar acetic acid was leached at ambient temperature for 30 minutes. The slurry was then filtered and the filter cake washed and dried. The quantities of recovered materials were as follows:

| | |
|---|---|
| Strong filtrate, L | 2.8 |
| Wash filtrate, L | 0.9 |
| Wet filter cake, weight, g | 287 |
| Dry filter cake weight, g | 179 |
| Moisture in wet cake, % | 37.6 |

The concentrations of elements in the head dust, strong filtrate, wash filtrate and dry cake residue are shown in Table 1.

TABLE 1

| ITEM | ELEMENTS | | | | | | | | | | | | | |
|---|---|---|---|---|---|---|---|---|---|---|---|---|---|---|
| | Zn | Fe | Pb | Cd | Cu | Ni | Mn | Ca | Mg | Na | K | Al | Cl | Cr |
| Dust, wt % | 17.33 | 23.07 | 2.09 | 0.063 | 0.24 | 0.029 | 2.49 | 13.73 | 3.58 | 0.12 | 0.033 | 0.6 | 0.2 | |
| Strong Filtrate, g/L | 19.5 | 4.52 | 2.44 | 0.124 | 0.178 | 0.0079 | 0.6 | 21.2 | 4.06 | 0.202 | 0.062 | 0.17 | 0.3 | 0.02 |
| Wash Filtrate, g/L | 4.4 | 0.72 | 0.29 | 0.025 | 0.0372 | 0.0024 | 0.18 | 4.2 | 1.01 | 0.062 | 0.0207 | 0.035 | 0.149 | 0.006 |
| Dry Residue, wt. % | 13.67 | 47.67 | 1.23 | 0.036 | 0.34 | 0.061 | 5.09 | 2.71 | 2.13 | 0.071 | 0.021 | 0.95 | 0.05 | |
| Percent Extraction | 70.5 | 13.5 | 76.3 | 85.2 | 46.6 | 18.2 | 16.8 | 92.9 | 76.4 | 83.0 | 83.6 | 23.0 | 91.6 | |
| Accountability, % | 106.5 | 95.0 | 96.8 | 116.2 | 105.6 | 102.3 | 97.8 | 110.0 | 100.2 | 138.6 | 134.8 | 81.8 | 118.2 | |

EXAMPLE 2

SULPHIDE PRECIPITATION

A stream of hydrogen sulphide gas was bubbled at the rate of 1 L/min. through 2.5 L of mixed filtrates from the acid leaching experiments. An agitated baffled vessel was used and the temperature was maintained at 25° C. Samples of the resulting precipitated sulphide slurry were withdrawn at elapsed times of 15, 30 and 60 minutes for analysis of the liquid portions. The slurry was then filtered and the filter cake washed and dried. The quantities of recovered materials were as follows:

| | |
|---|---|
| Strong filtrate, L | 2.1 |
| Wash filtrate, L | 0.1 |
| Wet filter cake, weight, g | 479 |
| Dry filter cake weight, g | 108 |
| Moisture in wet cake, % | 77.4 |

The concentrations of elements in the head liquor, strong liquor samples, wash filtrate and the dry cake residue are shown in Table 2.

The concentrations of elements in the head liquor, strong liquor samples, wash filtrate and the dry cake residue are shown in Table 3.

TABLE 2

| ITEM | ELEMENTS | | | | | | | | | | |
|---|---|---|---|---|---|---|---|---|---|---|---|
| | Zn | Fe | Pb | Cd | Cu | Mn | Mg | Ca | Al | SiO$_2$ | Cr |
| Head Liquor, g/L | 14.4 | 3.06 | 1.88 | 0.1 | 0.135 | 0.49 | 3.04 | 15.6 | 0.102 | 0.369 | 0.0144 |
| Strong Filtrate, g/L | | | | | | | | | | | |
| 15 minutes | 0.02 | 2.21 | 0.0027 | 0.0001 | 0.00028 | 0.5 | 2.94 | 15 | 0.074 | 0.352 | 0.00119 |
| 30 minutes | 0.002 | 0.024 | 0.0028 | 0.0001 | 0.00036 | 0.47 | 2.88 | 14.6 | 0.101 | 0.373 | 0.0131 |
| 60 minutes | 0.0028 | 0.02 | 0.0029 | 0.0001 | 0.00027 | 0.44 | 2.7 | 13.8 | 0.1 | 0.299 | 0.013 |
| Wash Filtrate, g/L | 0.0103 | 0.014 | 0.0019 | 0 | 0.00014 | 0.14 | 0.42 | 2 | 0.0018 | 0.043 | 0.00017 |
| Dry Residue, wt. % | 29.33 | 7.6 | 3.87 | 0.19 | 0.17 | 0.25 | 1.06 | 4.9 | 0.073 | 1.01 | — |
| Percent Extraction | 99.96 | 99.47 | 99.85 | 99.90 | 99.69 | 22.35 | 16.70 | 15.35 | 27.28 | 63.31 | — |
| Accountability, % | 88.0 | 107.9 | 89.1 | 82.2 | 54.6 | 98.6 | 90.2 | 88.4 | 113.3 | 186.8 | — |

TABLE 3

| ITEM | ELEMENTS | | | | | | | | | |
|---|---|---|---|---|---|---|---|---|---|---|
| | Zn | Fe | Pb | Cd | Cu | Mn | Mg | Ca | Al | SiO$_2$ |
| Head Liquor, g/L | 0.0067 | 0.0064 | 0.002 | 0.0007 | 0.00032 | 0.41 | 2.56 | 14 | 0.106 | 0.215 |
| Strong Filtrate, g/L | | | | | | | | | | |
| 90% stoichiometric H$_2$SO$_4$ | 0.00127 | 0.0182 | — | — | — | 0.41 | 2.58 | 0.86 | — | 0.00127 |
| 100% stoichiometric (sample lost) | | | | | | | | | | |
| 110% stoichiometric | 0.00077 | 0.0201 | — | — | — | 0.43 | 2.56 | 0.28 | — | 0.00077 |
| Wash Filtrate, g/L | 0.00092 | 0.0167 | — | — | — | 0.36 | 2.18 | 0.34 | — | 0.00092 |
| Dry Residue, wt. % | 0.051 | 0.009 | 0.007 | 0.001 | — | — | 1.39 | 27.5 | — | 0.11 |
| Percent Extraction | 325 | 60 | 150 | 61 | — | — | 23.2 | 84.1 | — | 21.9 |
| Accountability, % | 337 | 351 | 150 | 61 | — | — | 116 | 85.8 | — | 22.2 |

It will be noted that after the first 15 minutes of reaction time, Zn, Pb, Cd and Cu were essentially quantitatively precipitated, while only about 28% of the iron was precipitated at that time. This indicates that the concentration of iron in the residue can be to a large extent controlled by adjusting the conditions under which sulphide precipitation is carried out (excess H$_2$S used, temperature, time, etc.). Other elements, such as Mg, Ca, and Al did not precipitate appreciably (between 1 and 4%) during the first 15 minutes suggesting that their concentrations in the residue (or sulphide byproduct) can also be controlled along with the iron.

EXAMPLE 3

CALCIUM REMOVAL

Calcium was precipitated from 2.5 L of mixed filtrates from the sulphide precipitation experiments using 90%, 100% and 110% of the stoichiometric sulphuric acid requirement. An agitated baffled vessel was used and the reaction was carried out at 25° C. for a period of 1 hour after each acid addition. The final slurry was filtered and the filter cake washed and dried. The quantities of recovered materials were as follows:

| | |
|---|---|
| Strong filtrate, L | 2.177 |
| Wash filtrate, L | 0.168 |
| Wet filter cake, weight, g | 309 |
| Dry filter cake weight, g | 107 |
| Moisture in wet cake, % | 65.4 |

The poor accountability in most cases is attributable to inaccurate analyses at low concentrations.

We claim:

1. A method of processing carbon steel furnace dusts comprising the steps of subjecting the dusts to leaching by acetic acid of sufficient concentration substantially to dissolve leachable zinc and heavy metal values including lead into acetic acid solution, separating undissolved iron-containing residues, treating the acetic acid solution with hydrogen sulphide to precipitate zinc and other heavy metal sulphides and regenerate acetic acid, removing the sulphides, and treating the acetic acid solution with only sufficient sulphuric acid to precipitate most calcium present as calcium sulphate and regenerate further acetic acid without leaving significant levels of sulphate ions in solution, the acetic acid solution being returned to the leaching step.

2. A method according to claim 1 wherein the undissolved iron-containing residues are returned to a steel producing furnace.

3. A method according to claim 1, including a preliminary step of washing soluble chlorides from the dusts.

4. A method according to claim 1, including the step of removing cations including magnesium ions from the acetic acid solution prior to its return to the leaching step.

5. A method according to claim 4, wherein cations including magnesium ions are removed by an ion exchange process.

6. A method according to claim 4, wherein residual chloride and chloride residual and sulphate ions are removed by an ion exchange process.

7. A method according to claim 2, including the step of removing magnesium ions from the acetic acid solution prior to its return to the leaching step.

* * * * *